(No Model.)
G. C. HINMAN.
PERCH AND FOOD HOLDER FOR CAGES.
No. 340,116. Patented Apr. 20, 1886.
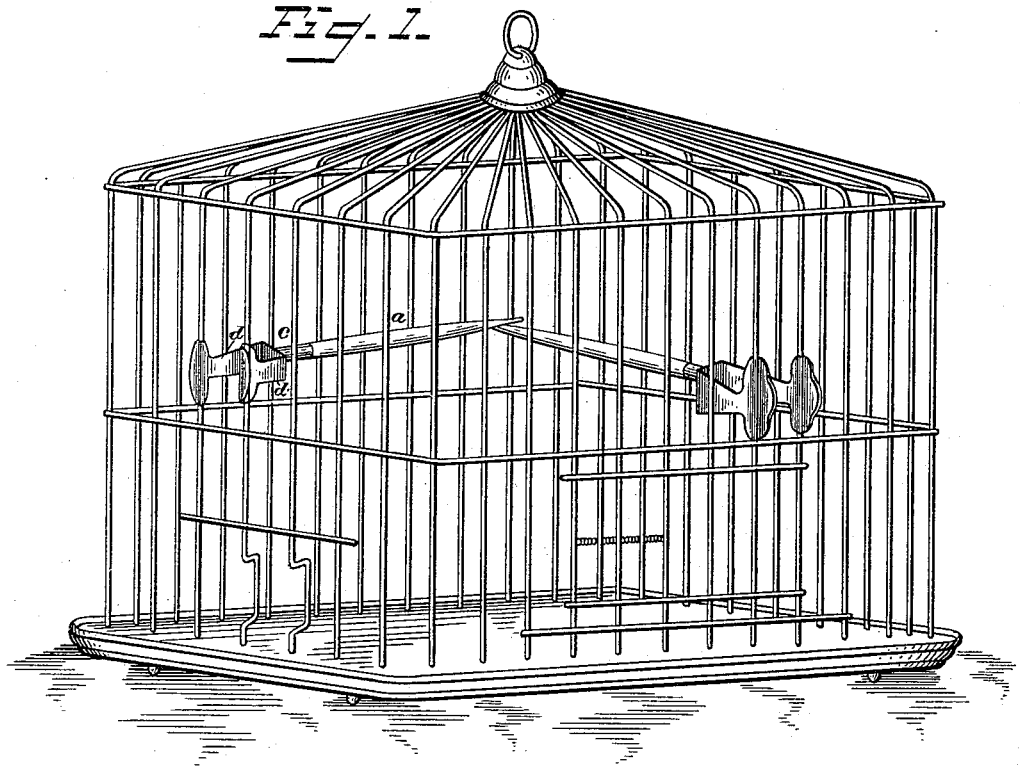
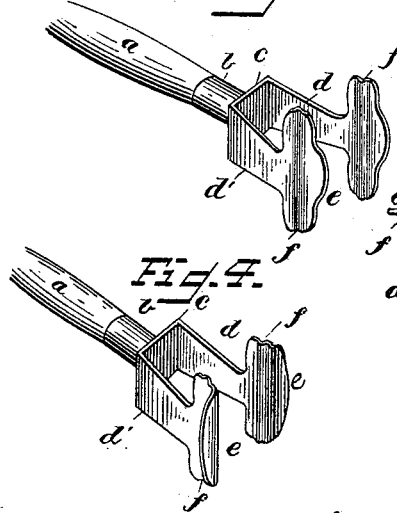
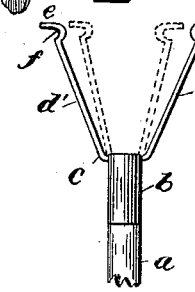
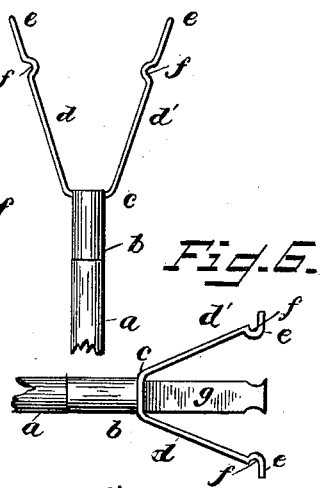
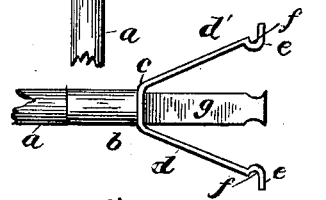
Witnesses.
J. T. Cross
Wm. H. Bates.
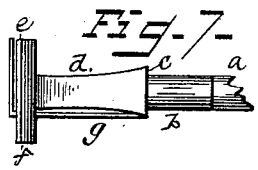
Inventor.
Geo. C. Hinman,
by Allen Webster
Atty.
N. PETERS, Photo-Lithographer, Washington, D. C.

United States Patent Office.

GEORGE C. HINMAN, OF SPRINGFIELD, MASSACHUSETTS.

PERCH AND FOOD HOLDER FOR CAGES.

SPECIFICATION forming part of Letters Patent No. 340,116, dated April 20, 1886.

Application filed September 26, 1884. Serial No. 144,074. (No model.)

*To all whom it may concern:*

Be it known that I, GEORGE C. HINMAN, a citizen of the United States, residing in Springfield, Hampden county, Massachusetts, have invented new and useful Improvements in Perch and Food Holders for Cages, of which the following is a specification, reference being had to the accompanying drawings.

Heretofore it has been generally necessary to place the hand inside the cage in order to adjust the perch or food holder in place. The objection to this is too obvious to require comment. Several perch-holders have also been constructed which were adapted to allow of the insertion of the perch from the outside. These, however, are objectionable, for the reasons that the spring of the bars of the cage is relied upon to hold the same in position, and a variation in the distance of separation of the bars of the cage materially interferes with the firmness with which the perch is held in place, and a device so constructed adapted to be used in a cage wherein the bars are separated one-half of one inch cannot be used to advantage in a cage wherein the bars are separated three or five eighths inch without bending the bars of the cage.

The object of my invention is to provide a perch and food holder of simple and cheap construction, with which the perch or food may be readily inserted from the outside of the cage, and with which the same will be firmly held in place without reference to the distance (within a reasonable limit) of the separation of the bars, and without relying upon the spring of the bars to hold the same in position; and I attain the object of my invention by means of spring arms or holders attached to the perch and formed with indentations or grooves to engage the bars of the cage, and adapted by extension or spread of the spring to set in any desired location, as will be hereinafter set forth.

In the accompanying drawings, in which similar letters of reference indicate like parts, Figure 1 is a perspective of a bird-cage having my device in place. Fig. 2 is a perspective of the holder having the finger-pieces $e$ projecting outward. Fig. 3 is an edge view of the same. Fig. 4 is a perspective of the holder having the finger-pieces bent to lie parallel with the side of the cage. Fig. 5 is an edge view of the same. Fig. 6 is an edge view of the holder with a bottom attached between the spring sides, and Fig. 7 is a side view of the same.

The construction and operation will be readily understood on reference to the drawings.

$a$ represents a perch; $b$, a socket; $c$, a cross-piece, to which the socket is secured; $d\,d'$, side pieces, adapted to spring apart, and having recesses or grooves $f$, adapted to engage with the cage-bars.

The finger-pieces $e$ (shown in Figs. 2 and 3) form a convenient means to grasp with the finger and thumb while inserting the device. Figs. 4 and 5 show this piece bent to lie flat against the side of the cage. In some instances one and in some instances the other form of finger-piece will be found most convenient. The sides $d$ are preferably made of spring material, and diverge from the base, in order that they shall bear against the wires of the cage and set the perch in any desired position of elevation, it being the purpose to attain the hold by the extensible functions of the spring-arms.

The most convenient means of securing the perch to the holder is to insert the end in a socket, $b$.

The device may be used as a perch and food holder combined, or for each separately. The food, if of such size as to pass between the bars of the cage and to be grasped by the sides $d$ when in place, is inserted between the sides and thus held. The sides may be indented, bent, roughened, or otherwise adapted to grasp the food. Cuttle-fish shell and other like material may thus be held firmly in place. If it is desired to hold food that cannot be conveniently grasped by the side parts, then a bottom, $g$, is attached, which will prevent the material falling through.

The special advantage of this device is seen in the fact that it may be readily inserted or removed from the outside by simply passing the perch between the bars and compressing the spring-arms until the grooves are reached, when the grasp is released, and they expand with a force sufficient to hold the perch. The device may be used in different parts of the cage, without reference to the distance between the bars or to their elasticity, and without danger of springing or bending the bars. The frictional surface may be increased, if desired, by increasing the length of the portion in contact with the bars of the cage, thus giving a firmer hold.

I am aware that a perch has heretofore been made consisting of a cross-head secured to the end of the perch and formed with vertical side grooves in the edges of the cross-head, to afford bearing-seats for the wires of the cage.

Having therefore described my invention, what I claim is—

1. In combination, a perch and diverging spring holding pieces secured thereto and formed with grooves to engage with the cage-bars, substantially as described.

2. A perch-holder consisting of a base-piece, whereby it is secured to the perch, and formed with diverging spring-arms having grooves in their free ends to engage with the bars of the cage, substantially as described.

3. The bird-perch holder herein described, consisting of the cross-head $c$, with means to secure it to the end of the perch, and the diverging spring-arms $d\,d'$, formed with vertical grooves $f$ in their free ends, substantially as described, and for the purpose stated.

4. The perch-holder consisting of the cross-head $c$, with means to secure it to the end of perch, the diverging spring-arms $d\,d'$, provided with vertical grooves $f$ in their free ends, and extended finger-pieces $e$, substantially as described, and for the purpose stated.

5. The perch-holder consisting of the cross-head $c$, with means to secure it to the end of the perch, the diverging spring-arms $d\,d'$, formed with vertical grooves $f$ in their free ends, and the bottom piece, $g$, substantially as described, and for the purpose stated.

GEORGE C. HINMAN.

Witnesses:
ALLEN WEBSTER,
GEO. O. KINGSBURY.